United States Patent
Shimizu

(10) Patent No.: US 11,220,565 B2
(45) Date of Patent: *Jan. 11, 2022

(54) MODIFIED RESIN FOR MOLDED ARTICLE AND GOLF BALL

(71) Applicant: DOW-MITSUI POLYCHEMICALS CO., LTD., Tokyo (JP)

(72) Inventor: Takahiro Shimizu, Chiba (JP)

(73) Assignee: DOW-MITSUI POLYCHEMICALS CO., LTD., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 16/968,367

(22) PCT Filed: Feb. 12, 2019

(86) PCT No.: PCT/JP2019/004823
§ 371 (c)(1),
(2) Date: Aug. 7, 2020

(87) PCT Pub. No.: WO2019/159881
PCT Pub. Date: Aug. 22, 2019

(65) Prior Publication Data
US 2021/0047446 A1 Feb. 18, 2021

(30) Foreign Application Priority Data
Feb. 15, 2018 (JP) .............................. JP2018-025206

(51) Int. Cl.
*C08F 210/02* (2006.01)
*A63B 37/00* (2006.01)

(52) U.S. Cl.
CPC ........ *C08F 210/02* (2013.01); *A63B 37/0003* (2013.01); *A63B 2209/00* (2013.01); *C08F 2800/20* (2013.01); *C08F 2810/50* (2013.01)

(58) Field of Classification Search
CPC ........ C08F 220/04; C08F 220/06; C08F 8/32; C08F 210/02
See application file for complete search history.

(56) References Cited

U.S. PATENT DOCUMENTS

| | | | | |
|---|---|---|---|---|
| 3,435,009 A | * | 3/1969 | Sellet | ................. C08G 12/02 525/327.5 |
| 4,649,104 A | * | 3/1987 | Nakamura | ......... G03C 1/49845 430/203 |
| 6,380,318 B1 | | 4/2002 | Saito et al. | |
| 2011/0130216 A1 | | 6/2011 | Kim et al. | |
| 2015/0191573 A1 | * | 7/2015 | Fang | ................. C08G 73/0226 525/337 |

FOREIGN PATENT DOCUMENTS

| | | |
|---|---|---|
| JP | 6-25476 A | 2/1994 |
| JP | H10-45832 A | 2/1998 |
| JP | 11-43503 A | 2/1999 |
| JP | 11-299933 A | 11/1999 |
| JP | 2007-321024 A | 12/2007 |
| JP | 2012-107197 A | 6/2012 |
| JP | 2015-531418 A | 11/2015 |

OTHER PUBLICATIONS

Menyashev, Polymer Science, Series B, 2016, vol. 58, No. 5, pp. 556-563 (Year: 2016).*
Sivov, Petroleum Chemistry, 2006, vol. 46, No. 1, pp. 41-59 (Year: 2006).*
International Search Report (ISR) dated May 21, 2019 filed in PCT/JP2019/004823.

* cited by examiner

*Primary Examiner* — Robert C Boyle
(74) *Attorney, Agent, or Firm* — Rankin, Hill & Clark LLP

(57) ABSTRACT

The present invention is a modified resin for a molded article obtained by modifying an ionomer of an ethylene/unsaturated carboxylic acid copolymer with at least one guanidine compound selected from guanidine derivatives and salts thereof.

9 Claims, No Drawings

MODIFIED RESIN FOR MOLDED ARTICLE AND GOLF BALL

CROSS-REFERENCE TO RELATED APPLICATION

The present application claims priority based on Japanese Patent Application No. 2018-025206 filed on Feb. 15, 2018. The entirety of the above-mentioned patent applications is hereby incorporated by reference herein and made a part of this specification.

BACKGROUND OF THE INVENTION

Field of the Invention

The present invention relates to a modified resin for a molded article and a golf ball.

Description of the Related Art

In recent years, polyolefin resins such as ethylene homopolymers, copolymers of ethylene and another olefin, and copolymers of ethylene and an unsaturated carboxylic acid have been used in various fields. For example, a polyolefin resin blended with magnesium hydroxide, aluminum hydroxide or the like is excellent in flame retardancy, and is therefore used as a coating material for electric wires or as a member of electric and electronic devices. Modification of a polyolefin resin is widely performed by adding acid-modification or a basic compound according to an intended purpose.

As a resin to which a basic compound is added, for example, Patent Literature 1 discloses a flame retardant resin composition containing a salt of a guanidine compound of acid-modified polyolefin. It is described that by using the flame retardant resin composition, excellent mechanical properties as well as flame retardancy are provided.

Patent Literature 2 discloses an ethylene-vinyl ester copolymer saponified product and an ethylene-vinyl ester copolymer saponified product composition containing a basic amine compound. It is described that a material containing the composition is useful for a multilayer structure because of its improved adhesion to a polyester resin.

Patent Literature 3 discloses a polyolefin resin composition obtained by adding guanidine phosphate to a polyolefin. It is described that by the polyolefin resin composition, excellent mechanical properties can be realized while suppressing generation of corrosive gas during combustion.

On the other hand, an ionomer obtained by neutralizing a copolymer of ethylene and (meth) acrylic acid with a metal ion has a high hardness and an impact resilience coefficient, and is therefore used in an elastic material layer constituting a golf ball or the like (see Patent Literature 4). A multilayer golf ball such as a two-piece ball, a three-piece ball and a four-piece ball is the most common among golf balls, in which a core portion at the center is coated with a plurality of elastic material layers and an outermost layer cover is provided.

In a multilayer golf ball, materials of a core, a cover layer and a layer (intermediate layer) between the core and the cover layer, affect a repulsive force of the ball, initial velocity, flight distance, spin performance and ball hitting feeling. In general, a butadiene rubber is used for the core, and an ionomer resin is used for the intermediate layer, and an urethane resin and ionomer resin is used for the cover layer. A repulsive force, initial velocity, flight distance, spin performance and ball hitting feeling characteristic of respective golf ball brands are adjusted by selecting and combining the materials used for respective layers.

CITATION LIST

Patent Literature

Patent Literature 1: JP 2007-321024
Patent Literature 2: JP 2012-107197
Patent Literature 3: JP H06-25476
Patent Literature 4: JP H11-299933

SUMMARY OF THE INVENTION

However, there is room for further improvement in the impact resilience coefficient and flexural stiffness, so as to use a resin having excellent mechanical properties described in the above patent literatures as a material of a ball such as a golf ball. The present invention has been invented in view of the above circumstances. The object of the present invention is to provide a modified resin for a molded article having an excellent impact resilience coefficient and flexural stiffness, and a golf ball containing the modified resin for a molded article.

The inventors of the present invention have found that a modified resin obtained by modifying an ionomer of an ethylene/unsaturated carboxylic acid copolymer with at least one guanidine compound selected from guanidine derivatives and salts thereof has an excellent impact resilience coefficient and flexural stiffness, and have accomplished the present invention.

Namely, the modified resin for a molded article of the present invention is a modified resin for a molded article obtained by modifying an ionomer of an ethylene/unsaturated carboxylic acid copolymer with at least one guanidine compound selected from guanidine derivatives and salts thereof.

A melt flow rate of the ethylene/unsaturated carboxylic acid copolymer constituting the ionomer of the ethylene/unsaturated carboxylic acid copolymer is preferably 20 (g/10 minutes) or more and 600 (g/10 minutes) or less.

The melt flow rate (hereinafter referred to as MFR) is a value measured according to the Japanese Industrial Standard: JIS K7210 (1999) at a temperature of 190° C. and a loaded weight of 2160 g.

The ethylene/unsaturated carboxylic acid copolymer is preferably an ethylene/(meth) acrylic acid copolymer.

A content of a constituent unit derived from the unsaturated carboxylic acid in the ethylene/unsaturated carboxylic acid copolymer is preferably 10% by mass or more and 30% by mass or less with respect to the total content of constituent units of the ethylene/unsaturated carboxylic acid copolymer.

A degree of neutralization of the ionomer of the ethylene/unsaturated carboxylic acid copolymer in the modified resin for a molded article is preferably more than 0% and 80% or less.

The ionomer of the ethylene/unsaturated carboxylic acid copolymer preferably contains at least one of a zinc ionomer and a sodium ionomer.

The ratio (B/A) of the total number of moles (B) of the guanidino group or guanidinium ion in the guanidine compound to the total number of moles (A) of the carboxyl group contained in the ethylene/unsaturated carboxylic acid copolymer in the modified resin for a molded article, is preferably 0.05 or more and 0.8 or less.

The guanidine compound is preferably guanidine hydrochloride or guanidine carbonate.

The modified resin for a molded article is preferably a modified resin for a molded article, which is obtained by melt kneading the ionomer of the ethylene/unsaturated carboxylic acid copolymer and at least one guanidine compound selected from guanidine derivatives and salts thereof.

The golf ball of the present invention contains the modified resin for a molded article of the present invention.

According to the present invention, a modified resin for a molded article and a golf ball which are excellent in an impact resilience coefficient and flexural stiffness, can be obtained.

DETAILED DESCRIPTION OF THE INVENTION

Hereinafter, embodiments of the present invention are described. The numerical range of "X to Y" represents X or more and Y or less unless otherwise specified. In the embodiments, "(meth) acryl" means acrylic or methacrylic or both of acrylic and methacrylic.

[Modified Resin for a Molded Article]

The modified resin for a molded article according to the present embodiments is a modified resin for a molded article obtained by modifying an ionomer of an ethylene/unsaturated carboxylic acid copolymer with at least one guanidine compound of guanidine derivatives and salts thereof.

(Ionomer of Ethylene/Unsaturated Carboxylic Acid Copolymer)

The ionomer of the ethylene/unsaturated carboxylic acid copolymer in the modified resin for a molded article according to the present embodiments (hereinafter sometimes simply referred to as an ionomer) is a compound in which at least a part of the carboxylic acid groups of the ethylene/unsaturated carboxylic acid copolymer as a base polymer is neutralized with a metal ion.

—Ethylene/Unsaturated Carboxylic Acid Copolymer—

The ethylene/unsaturated carboxylic acid copolymer as a base polymer for the ionomer, is not limited to a copolymer consisting only of ethylene and an unsaturated carboxylic acid, and may be a multi-component copolymer in which the copolymer is copolymerized with arbitrary another copolymer component.

The unsaturated carboxylic acid includes a C4-8 unsaturated carboxylic acid such as acrylic acid, methacrylic acid, ethacrylic acid, fumaric acid, crotonic acid, maleic acid, itaconic acid, monomethyl maleate, monoethyl maleate, maleic anhydride and itaconic anhydride, and the like. Particularly preferable is acrylic acid or methacrylic acid. The unsaturated carboxylic acid may be one type or two or more types.

The arbitrary another copolymer component includes, for example, an unsaturated carboxylic acid ester such as methyl acrylate, ethyl acrylate, isobutyl acrylate, n-butyl acrylate, isooctyl acrylate, methyl methacrylate, ethyl methacrylate, isobutyl methacrylate, n-butyl methacrylate, dimethyl maleate and diethyl maleate; an unsaturated hydrocarbon such as propylene, butene, 1,3-butadiene, pentene, 1,3-pentadiene and 1-hexene; a vinyl ester such as vinyl acetate and vinyl propionate; an oxide such as vinyl sulfate and vinyl nitrate; a halide such as vinyl chloride and vinyl fluoride; a vinyl containing primary or secondary amine compound; carbon monoxide; sulfur dioxide; and the like. The above arbitrary another copolymer component may be copolymerized in a proportion of generally 15 mol % or less, preferably 10 mol % or less.

The ethylene/unsaturated carboxylic acid copolymer may be any of a block copolymer, a random copolymer and a graft copolymer. From the viewpoint of industrial availability, a binary random copolymer, a ternary random copolymer, a graft copolymer of a binary random copolymer or a graft copolymer of a ternary random copolymer may be preferably used. More preferable is a binary random copolymer or a ternary random copolymer.

—Content of Constituent Unit Derived from Unsaturated Carboxylic Acid—

A content of a constituent unit derived from the unsaturated carboxylic acid in the ethylene/unsaturated carboxylic acid copolymer constituting the modified resin for a molded article of the present embodiments, is preferably 10% by mass or more and 30% by mass or less, more preferably 12% by mass or more and 26% by mass or less, and even more preferably 14% by mass or more and 22% by mass or less, with respect to the total content of constituent units of the ethylene/unsaturated carboxylic acid copolymer. When a content of the constituent unit derived from the unsaturated carboxylic acid is 10% by mass or more and 30% by mass or less, the hardness, impact resilience coefficient and flexural stiffness are excellent.

Such an ethylene/unsaturated carboxylic acid copolymer is not particularly limited, but is preferably obtained by high-pressure radical copolymerization.

—MFR of Ethylene/Unsaturated Carboxylic Acid Copolymer (Unit: g/10 Minutes)—

MFR of the ethylene/unsaturated carboxylic acid copolymer constituting the ionomer of the ethylene/unsaturated carboxylic acid copolymer of the present invention, is preferably 20 or more and 600 or less. More preferably, it is 20 or more and 500 or less. When it is 600 or less, the impact resilience coefficient and flexural stiffness are improved. Moreover, when it is 20 or more, the viscosity is not too high, and the appearance and moldability are improved.

The number average molecular weight (Mn) is preferably about 10,000 or more and about 30,000 or less in terms of polystyrene.

(Ionomer)

The ionomer of the ethylene/unsaturated carboxylic acid copolymer can be obtained by ionizing the above ethylene/unsaturated carboxylic acid copolymer by a conventional method.

The ethylene/unsaturated carboxylic acid copolymer may be ionized by melt blending, using an ethylene/unsaturated carboxylic acid copolymer together with an ionomer. Commercially available products may be used as an ionomer. As the commercially available product, HIMILAN® series (Dow-Mitsui Polychemicals Co., Ltd.) and SURLYN® (DuPont de Nemours, Inc.) or the like may be used. The ionomer may also be obtained by saponification of an ethylene/unsaturated carboxylic acid ester copolymer.

A metal ion in the ionomer includes, for example, a monovalent metal such as lithium, sodium, potassium, rubidium and cesium; and a polyvalent metal such as zinc, magnesium, calcium, manganese, copper, tin, nickel, cobalt and aluminum. As the monovalent metal, sodium is preferable. As the polyvalent metal, a divalent metal is preferable, and zinc is preferable.

(Degree of Neutralization of Ionomer)

The degree of neutralization of the ionomer is preferably more than 0% and 80% or less. From the viewpoint of improving the impact resilience coefficient and flexural stiffness, it is more preferably 20% or more, and even more preferably 30% or more. From the viewpoint of the moldability, it is more preferably 70% or less, and even more preferably 60% or less. Here, "degree of neutralization of the ionomer" means an equivalent ratio of a metal ion to a carboxyl group of the ionomer.

(Guanidine Compound)

In the present invention, the guanidine compound means a guanidine derivative (including guanidine) and a salt thereof.

—Guanidine Derivative and a Salt Thereof—

The guanidine derivative includes, for example, guanidine; a C1-20 alkyl substituted guanidine (e.g. N-methyl or N-ethylguanidine, 1,3-dimethyl or 1,3-diethylguanidine, etc.); an aromatic guanidine (e.g. phenylguanidine, diphenylguanidine, etc.); a biguanide compound (e.g. biguanide, N-methylbiguanide, N-benzoylbiguanide, N-phenylbiguanide, cyanobiguanide, etc.); a guanyl $C_{1-20}$ alkyl urethane (e.g. guanylmethylurethane, guanylethylurethane, etc.); and another guanidine derivative (e.g. aminoguanidine, dicyanoguanidine, guanyl (thio)urea, cyanoguanyl (thio)urea, etc.).

The salt of the guanidine derivative includes, for example, hydrochloride, chlorate, perchlorate, hydrobromide, hydroiodide, sulfate, sulfite, phosphate, nitrate, carbonate, and a salt of an organic acid (e.g. formic acid, acetic acid, propionic acid, sulfonic acid) of the above guanidine derivative.

From the viewpoint of availability and reactivity, preferable are guanidine, a $C_{1-20}$ alkyl guanidine, an aromatic guanidine and an inorganic or organic acid salt thereof. More preferable are guanidine and a carbonate, a hydrochloride, a sulfate, a nitrate, a phosphate, an acetate and a sulfonate thereof. Even more preferable are guanidine and a carbonate, a hydrochloride, a sulfate, a nitrate, an acetate and a sulfonate thereof. Most preferable are guanidine hydrochloride or guanidine carbonate.

(Molar ratio of guanidino group or guanidinium ion in guanidine compound to carboxyl group contained in ethylene/unsaturated carboxylic acid copolymer)

From the viewpoint of improving the impact resilience coefficient and flexural stiffness, the ratio (B/A) of the total number of moles (B) of the guanidino group or guanidinium ion in the guanidine compound to the total number of moles (A) of the carboxyl group derived from the unsaturated carboxylic acids contained in the ethylene/unsaturated carboxylic acid copolymer in the modified resin for a molded article, is preferably 0.05 or more and 0.8 or less, more preferably 0.05 or more and 0.7 or less, and even more preferably 0.05 or more and 0.6 or less.

(Optional Component)

To the modified resin for a molded article according to the present embodiments, various additives may be optionally blended, such as another thermoplastic resin, a tackifying resin, a wax, an antioxidant, a weathering stabilizer, a light stabilizer, a heat stabilizer, an ultraviolet ray absorbent, a lubricant, a pigment, a dye, an inorganic filler, and the like.

[Method of Producing the Modified Resin for a Molded Article]

The modified resin for a molded article of the present invention can be prepared by adding and melt kneading the ionomer of the ethylene/unsaturated carboxylic acid copolymer, the guanidine compound, and the optional component, if necessary. The melt kneading temperature is preferably 50 to 300° C., more preferably 100 to 250° C. from the viewpoint of the melting temperatures and decomposition temperatures of the ionomer of the ethylene/unsaturated carboxylic acid copolymer and the guanidine compound.

A melt kneading apparatus is not particularly restricted, but includes, for example, a batch kneader (for example, Banbury Mixer [Product name, Farrel Corporation] and a kneader), a continuous kneader (for example, FCM [Product name, Farrel Corporation], LCM [Product name, Kobe Steel, Ltd.] and CIM [Product name, Nippon Steel Corporation], a single screw extruder and a twin screw extruder.

The resin composition containing the modified resin for a molded article according to the present embodiments is excellent in the impact resilience coefficient and flexural stiffness. Therefore, the resin composition is useful for a ball, a toy member, an automobile member, a building member, a film, a sheet article or the like that requires such characteristics. Moreover, the resin composition may be blended with another resin such as nylon, PET and PBT, as a modifier.

[Golf Ball]

The golf ball according to the present embodiments can be prepared by melt kneading and molding a material in which the modified resin for a molded article according to the present embodiments and the optional component, if necessary, are blended. For example, it can be used as a one-piece ball material, a core material of the golf ball, or a cover material of the golf ball. Regarding the cover material, it can be used not only as a cover material of a two-piece ball, but also as an outer cover material or an inner cover material of a double cover ball. The melt kneading condition is the same as in the above production of the ionomer.

EXAMPLE

Hereinafter, the present invention will be described more specifically with reference to examples. However, the scope of the present invention is not limited to the specific examples shown below.

[Raw Material]

(A) Ionomer of Ethylene/Unsaturated Carboxylic Acid Copolymer (a1) Ionomer obtained by neutralizing an ethylene/methacrylic acid copolymer (ethylene: methacrylic acid=85:15 by mass ratio (a content of a constituent unit derived from ethylene in the ethylene/unsaturated carboxylic acid copolymer is 85% by mass, and a content of a constituent unit derived from the unsaturated carboxylic acid is 15% by mass), MFR=60 (g/10 minutes)) with sodium ion at a degree of neutralization of 54%.

(a2) Ionomer obtained by neutralizing an ethylene/methacrylic acid copolymer (ethylene:methacrylic acid=85:15 by mass ratio (a content of a constituent unit derived from ethylene in the ethylene/unsaturated carboxylic acid copolymer is 85% by mass, and a content of a constituent unit derived from the unsaturated carboxylic acid is 15% by mass), MFR=60 (g/10 minutes)) with zinc ion at a degree of neutralization of 59%.

(B) Guanidine Compound (b1) Guanidine hydrochloride (Tokyo Chemical Industry Co., Ltd.)

(b2) Guanidine carbonate (Tokyo Chemical Industry Co., Ltd.)

[Physical Property Measurement Method]

An impact resilience coefficient and a flexural stiffness were measured as follows.

(Impact Resilience Coefficient)

A sheet having a size of 150 mm×150 mm×3 mm thick was prepared using the obtained modified resin for a molded article and a hot press machine set at 160° C. A test piece having a layer thickness of about 13 mm (a diameter of the test piece: 29±0.5 mm) was prepared using a hot press machine set at 140° C. again by stacking six sheets obtained by punching the obtained sheet into a circle shape. This test piece was stored in an atmosphere of 23° C. and 50% relative humidity for 2 weeks. Then, the impact resilience coefficient was measured using this test piece with the Lupke impact resilience tester. The measurement condition was based on the Japanese Industrial Standard: JIS K6255: 2013.

(Flexural Stiffness)

A sheet having a size of 150 mm×150 mm×3 mm thick was prepared using the obtained modified resin for a molded article and a hot press machine set at 160° C. A test piece was prepared by punching the obtained sheet into a strip shape having a width of 20 mm and a length of 100 mm. This test piece was stored in an atmosphere of 23° C. and 50% relative humidity for 2 weeks. Then, the flexural stiffness was measured using this test piece. The measurement condition was based on the Japanese Industrial Standard: JIS K7106: 1995.

<Modified Resin for a Molded Article Modified with Guanidine Hydrochloride>

At first, examples are described in which an ionomer of an ethylene/methacrylic acid copolymer is modified with guanidine hydrochloride.

Example 1-1

An ionomer of an ethylene/methacrylic acid copolymer modified with guanidine hydrochloride (a modified resin for a molded article) was obtained by adding a sodium ionomer of an ethylene/methacrylic acid copolymer (a1) and guanidine hydrochloride (b1) into LABO PLASTOMILL (product name "LABO PLASTOMILL 10C-100", Toyo Seiki Seisakusho Co., Ltd.) so that the content of guanidine hydrochloride is 1.0% by mass with respect to 100% by mass of the sum of the sodium ionomer of the ethylene/methacrylic acid copolymer (a1) and guanidine hydrochloride (b1), followed by kneading the mixture at 200° C. and at 50 rpm for 5 to 10 minutes. The molar ratio of the guanidinium ion in the modified resin for a molded article to the total number of moles of the carboxyl group in the ethylene/methacrylic acid copolymer was 0.057.

Example 1-2

A modified resin for a molded article was obtained in the same manner as in Example 1-1 except that the content of guanidine hydrochloride (b1) was 4.8% by mass. The molar ratio of the guanidinium ion in the modified resin for a molded article to the total number of moles of the carboxyl group in the ethylene/methacrylic acid copolymer was 0.23.

Example 1-3

A modified resin for a molded article was obtained in the same manner as in Example 1-1 except that the content of guanidine hydrochloride (b1) was 10.0% by mass. The molar ratio of the guanidinium ion in the modified resin for a molded article to the total number of moles of the carboxyl group in the ethylene/methacrylic acid copolymer was 0.40.

Comparative Example 1-1

A sodium ionomer of an ethylene/methacrylic acid copolymer (a1) was not modified with guanidine hydrochloride (b1).

Example 1-4

An ionomer of an ethylene/methacrylic acid copolymer modified with guanidine hydrochloride (a modified resin for a molded article) was obtained by adding a zinc ionomer of an ethylene/methacrylic acid copolymer (a2) and guanidine hydrochloride (b1) into LABO PLASTOMILL (product name "LABO PLASTOMILL 10C-100", Toyo Seiki Seisakusho Co., Ltd.) so that the content of guanidine hydrochloride is 1.0% by mass with respect to 100% by mass of the sum of the zinc ionomer of the ethylene/methacrylic acid copolymer (a2) and guanidine hydrochloride (b1), followed by kneading the mixture at 200° C. and at 50 rpm for 5 to 10 minutes. The molar ratio of the guanidinium ion in the modified resin for a molded article to the total number of moles of the carboxyl group in the ethylene/methacrylic acid copolymer was 0.057.

Example 1-5

A modified resin for a molded article was obtained in the same manner as in Example 1-4 except that the content of guanidine hydrochloride (b1) was 4.8% by mass. The molar ratio of the guanidinium ion in the modified resin for a molded article to the total number of moles of the carboxyl group in the ethylene/methacrylic acid copolymer was 0.23.

Example 1-6

A modified resin for a molded article was obtained in the same manner as in Example 1-4 except that the content of guanidine hydrochloride (b1) was 10.0% by mass. The molar ratio of the guanidinium ion in the modified resin for a molded article to the total number of moles of the carboxyl group in the ethylene/methacrylic acid copolymer was 0.40.

Comparative Example 1-2

A zinc ionomer of an ethylene/methacrylic acid copolymer (a2) was not modified with guanidine hydrochloride (b1).

Table 1 shows the physical properties measured for Examples 1-1 to 1-6 and Comparative Examples 1-1 and 1-2. "Guanidinium/MAA" in Table 1 means the molar ratio of the guanidinium ion in the modified resin for a molded article to the total number of moles of the carboxyl group in the ethylene/methacrylic acid copolymer in the modified resin for a molded article.

TABLE 1

| | Guanidinium/MAA (molar ratio) | Impact resilience coefficient (%) | Bending rigidity (MPa) |
| --- | --- | --- | --- |
| Example 1-1 | 0.057 | 65.0 | 312 |
| Example 1-2 | 0.23 | 67.1 | 349 |
| Example 1-3 | 0.40 | 65.6 | 346 |
| Comparative Example 1-1 | — | 65.0 | 304 |
| Example 1-4 | 0.057 | 63.4 | 317 |
| Example 1-5 | 0.23 | 64.8 | 306 |
| Example 1-6 | 0.40 | 66.0 | 303 |
| Comparative Example 1-2 | — | 61.0 | 274 |

As shown in Table 1, the sodium ionomers modified with guanidine hydrochloride in Examples 1-1 to 1-3 have higher impact resilience coefficient and flexural stiffness, compared with the unmodified sodium ionomer in Comparative Example 1-1. The zinc ionomers modified with guanidine hydrochloride in Examples 1-4 to 1-6 have higher impact resilience coefficient and flexural stiffness, compared with the unmodified zinc ionomer in Comparative Example 1-2.

<Modified Resin for a Molded Article Modified with Guanidine Carbonate>

Next, examples are described in which an ionomer of an ethylene/methacrylic acid copolymer is modified with guanidine carbonate.

Example 2-1

An ionomer of an ethylene/methacrylic acid copolymer modified with guanidine carbonate (a modified resin for a molded article) was obtained by adding a sodium ionomer of an ethylene/methacrylic acid copolymer (a1) and guanidine carbonate (b2) into LABO PLASTOMILL (product name "LABO PLASTOMILL 10C-100", Toyo Seiki Seisakusho Co., Ltd.) so that the content of guanidine carbonate is 2.0% by mass with respect to 100% by mass of the sum of the sodium ionomer of the ethylene/methacrylic acid copolymer (a1) and guanidine carbonate (b2), followed by kneading the mixture at 220 to 230° C. and at 50 rpm for 5 to 10 minutes. The molar ratio of the guanidinium ion in the modified resin for a molded article to the total number of moles of the carboxyl group in the ethylene/methacrylic acid copolymer was 0.12.

Example 2-2

A modified resin for a molded article was obtained in the same manner as in Example 2-1 except that the content of guanidine carbonate (b2) was 4.5% by mass. The molar ratio of the guanidinium ion in the modified resin for a molded article to the total number of moles of the carboxyl group in the ethylene/methacrylic acid copolymer was 0.23.

Example 2-3

A modified resin for a molded article was obtained in the same manner as in Example 2-1 except that the content of guanidine carbonate (b2) was 9.5% by mass. The molar ratio of the guanidinium ion in the modified resin for a molded article to the total number of moles of the carboxyl group in the ethylene/methacrylic acid copolymer was 0.40.

Comparative Example 2-1

A sodium ionomer of an ethylene/methacrylic acid copolymer (a1) was not modified with guanidine carbonate (b2).

Example 2-4

A modified resin for a molded article was obtained in the same manner as in Example 2-1 except that a zinc ionomer (a2) of an ethylene/methacrylic acid copolymer was used and the content of guanidine carbonate (b2) was 2.0% by mass. The molar ratio of the guanidinium ion in the modified resin for a molded article to the total number of moles of the carboxyl group in the ethylene/methacrylic acid copolymer was 0.12.

Example 2-5

A modified resin for a molded article was obtained in the same manner as in Example 2-4 except that the content of guanidine carbonate (b2) was 4.5% by mass. The molar ratio of the guanidinium ion in the modified resin for a molded article to the total number of moles of the carboxyl group in the ethylene/methacrylic acid copolymer was 0.23.

Example 2-6

A modified resin for a molded article was obtained in the same manner as in Example 2-4 except that the content of guanidine carbonate (b2) was 9.5% by mass. The molar ratio of the guanidinium ion in the modified resin for a molded article to the total number of moles of the carboxyl group in the ethylene/methacrylic acid copolymer was 0.40.

Comparative Example 2-2

A zinc ionomer of an ethylene/methacrylic acid copolymer (a2) was not modified with guanidine carbonate (b2).

"Guanidinium/MAA" in Table 2 means the molar ratio of the guanidinium ion in the modified resin for a molded article to the total number of moles of the carboxyl group in the ethylene/methacrylic acid copolymer in the modified resin for a molded article.

TABLE 2

| | Guanidinium/MAA (molar ratio) | Impact resilience coefficient (%) | Bending rigidity (MPa) |
|---|---|---|---|
| Example 2-1 | 0.12 | 66.0 | 308 |
| Example 2-2 | 0.23 | 66.8 | 317 |
| Example 2-3 | 0.40 | 66.5 | 310 |
| Comparative Example 2-1 | — | 65.0 | 304 |
| Example 2-4 | 0.12 | 67.1 | 331 |
| Example 2-5 | 0.23 | 66.9 | 334 |
| Example 2-6 | 0.40 | 65.5 | 333 |
| Comparative Example 2-2 | — | 61.0 | 274 |

As shown in Table 2, the sodium ionomers modified with guanidine carbonate in Examples 2-1 to 2-3 have higher impact resilience coefficient and flexural stiffness, compared with the unmodified sodium ionomer in Comparative Example 2-1. The zinc ionomers modified with guanidine carbonate in Examples 2-4 to 2-6 have higher impact resilience coefficient and flexural stiffness, compared with the unmodified zinc ionomer in Comparative Example 2-2.

As described above, the resin obtained by modifying the ionomer of the ethylene/unsaturated carboxylic acid copolymer with a guanidine salt of the present invention has an excellent impact resilience coefficient and flexural stiffness.

The present application claims priority based on Japanese Patent Application No. 2018-025206 filed on Feb. 15, 2018, the entire disclosure of which is incorporated herein.

The invention claimed is:

1. A modified resin for a molded article, comprising an ionomer of an ethylene/unsaturated carboxylic acid copolymer modified with at least one guanidine compound selected from guanidine derivatives and salts thereof,
    wherein the ethylene/unsaturated carboxylic acid copolymer is an ethylene/(meth) acrylic acid copolymer.

2. The modified resin for a molded article according to claim 1, wherein a melt flow rate of an ethylene/unsaturated carboxylic acid copolymer constituting the ionomer of the ethylene/unsaturated carboxylic acid copolymer is 20 (g/10 minutes) or more and 600 (g/10 minutes) or less.

3. The modified resin for a molded article according to claim 1, wherein a content of a constituent unit derived from the unsaturated carboxylic acid in the ethylene/unsaturated carboxylic acid copolymer is 10% by mass or more and 30% by mass or less with respect to the total content of constituent units of the ethylene/unsaturated carboxylic acid copolymer.

4. The modified resin for a molded article according to claim 1, wherein a degree of neutralization of the ionomer of the ethylene/unsaturated carboxylic acid copolymer is more than 0% and 80% or less.

5. The modified resin for a molded article according to claim 1, wherein the ionomer of the ethylene/unsaturated carboxylic acid copolymer contains at least one of a zinc ionomer and a sodium ionomer.

6. The modified resin for a molded article according to claim 1, wherein the ratio (B/A) of the total number of moles (B) of the guanidino group or guanidinium ion in the guanidine compound to the total number of moles (A) of the carboxyl group contained in the ethylene/unsaturated carboxylic acid copolymer in the modified resin for a molded article, is 0.05 or more and 0.8 or less.

7. The modified resin for a molded article according to claim 1, wherein the guanidine compound is guanidine hydrochloride or guanidine carbonate.

8. The modified resin for a molded article according to claim 1, wherein the ionomer of the ethylene/unsaturated carboxylic acid copolymer and at least one guanidine compound selected from guanidine derivatives and salts thereof are melt kneaded.

9. A golf ball comprising the modified resin for a molded article according to claim 1.

* * * * *